(12) United States Patent
Anno et al.

(10) Patent No.: US 9,249,701 B2
(45) Date of Patent: Feb. 2, 2016

(54) VALVE CASE FOR OIL CONTROL VALVE

(75) Inventors: Yasushi Anno, Kariya (JP); Naoki Kira, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 112 days.

(21) Appl. No.: 13/045,641

(22) Filed: Mar. 11, 2011

(65) Prior Publication Data

US 2011/0233447 A1    Sep. 29, 2011

(30) Foreign Application Priority Data

Mar. 23, 2010    (JP) ................................. 2010-066561

(51) Int. Cl.

| F16K 11/07 | (2006.01) |
|---|---|
| F16K 27/00 | (2006.01) |
| F01M 9/10 | (2006.01) |
| F01L 1/34 | (2006.01) |
| F01M 1/16 | (2006.01) |
| F01L 1/344 | (2006.01) |
| F16K 27/04 | (2006.01) |
| F16K 31/06 | (2006.01) |
| F15B 13/04 | (2006.01) |

(52) U.S. Cl.
CPC .......... *F01M 1/16* (2013.01); *F01L 2001/3443* (2013.01); *F01L 2001/34426* (2013.01); *F01L 2001/34433* (2013.01); *F15B 13/0402* (2013.01); *F16K 27/041* (2013.01); *F16K 31/0613* (2013.01); *Y10T 137/8671* (2015.04); *Y10T 137/86702* (2015.04)

(58) Field of Classification Search
CPC .............. F01L 2001/3443; F01L 2001/34433; F01L 2001/34426; Y10T 137/86702; Y10T 137/8671; F16K 27/041; F16K 31/0613; F15B 13/0402

USPC ................. 251/366; 123/90.38, 90.17, 90.16, 123/90.15, 90.33, 90.34, 90.12, 193.5, 123/195 C; 137/625.68, 625.69

See application file for complete search history.

(56) References Cited

U.S. PATENT DOCUMENTS

| 6,129,060 | A | 10/2000 | Koda | |
|---|---|---|---|---|
| 6,684,836 | B2 * | 2/2004 | Inoue | 123/90.17 |
| 6,834,676 | B2 * | 12/2004 | Kulmann | 137/625.66 |
| 7,255,078 | B2 * | 8/2007 | Yoshijima et al. | 123/90.38 |
| 8,047,222 | B2 * | 11/2011 | Lent et al. | 137/375 |

(Continued)

FOREIGN PATENT DOCUMENTS

| JP | 63-27770 U | 2/1988 |
|---|---|---|
| JP | 11-193871 A | 7/1999 |

(Continued)

OTHER PUBLICATIONS

Japanese Office Action dated Oct. 31, 2013 issued in the corresponding Japanese Patent Application No. 2010-066561.
Chinese Notification of the First Office Action dated Apr. 1, 2014 issued in the corresponding Chinese Patent Application No. 201110063790.4 and English-language translation (15 pages).

*Primary Examiner* — John K Fristoe, Jr.
*Assistant Examiner* — Hailey K Do
(74) *Attorney, Agent, or Firm* — Buchanan Ingersoll & Rooney PC

(57) ABSTRACT

A valve case includes a housing portion including a cylindrical space for housing a spool of an oil control valve, and a wall portion including a drain space arranged cross to the cylindrical space. The housing portion and the wall portion are integrally formed.

16 Claims, 4 Drawing Sheets

(56) References Cited

U.S. PATENT DOCUMENTS

| | | | |
|---|---|---|---|
| 8,161,928 B2 * | 4/2012 | Kojima et al. | 123/90.38 |
| 2003/0145814 A1 | 8/2003 | Inoue | |
| 2005/0252465 A1 | 11/2005 | Itou | |
| 2008/0011254 A1 * | 1/2008 | Matsushima et al. | 123/90.17 |
| 2009/0301427 A1 | 12/2009 | Kojima et al. | |
| 2010/0243934 A1 * | 9/2010 | Kira et al. | 251/129.15 |
| 2011/0168276 A1 * | 7/2011 | Kira et al. | 137/343 |

FOREIGN PATENT DOCUMENTS

| | | | |
|---|---|---|---|
| JP | 2007-170603 A | 7/2007 | |
| JP | 2009-293555 A | 12/2009 | |
| JP | 5447987 * | 1/2014 | F16K 27/04 |
| WO | 02/46583 A1 | 6/2002 | |

* cited by examiner

VALVE CASE FOR OIL CONTROL VALVE

CROSS REFERENCE TO RELATED APPLICATIONS

This application is based on and claims priority under 35 U.S.C. §119 to Japanese Patent Application 2010-066561, filed on Mar. 23, 2010, the entire content of which is incorporated herein by reference.

TECHNICAL FIELD

This disclosure relates to a valve case housing a spool for an oil control valve.

BACKGROUND DISCUSSION

A known valve case housing a spool for an oil control valve is disclosed in JP2009-293555A (i.e., hereinafter referred to as Patent reference 1). When the valve case is formed at an outer shell portion of a resin-made cylinder head cover by an insert molding, a clearance may be generated at contact surfaces of the valve case and the outer shell portion when the resin shrinks. In order to overcome this drawback, the valve case described in Patent reference 1 includes a flange portion having plural penetration holes. According to the disclosure of Patent reference 1, the foregoing construction maintains a close contact state of the valve case and the outer shell portion because the resin provided at an upper side of the flange portion and the resin provided at a lower side of the flange portion retains the flange portion in response to shrinkage of the resin filled in the penetration holes.

A main portion of the valve case disclosed in Patent reference 1 is formed by forming oil passages on a cylindrical housing portion which houses the spool. Thus, according to the construction disclosed in Patent reference 1, when an injection pressure of resin for covering the cylindrical housing portion and/or a pressure generated when the resin shrinks, or the like, is applied in a radially inward direction, the housing portion may be deformed because there is no structure which resists the applied pressure. In order to prevent the foregoing deformation, a pressure-resisting performance may be increased by increasing a thickness of the housing portion. However, this counter measurement is inconsistent with a structure that the cylinder head cover is made of resin in order to reduce the weight.

Drawbacks of the known valve case disclosed in Patent reference 1 will be explained with reference to FIGS. 7A and 7B. FIG. 7A shows a cross-sectional view after a known valve case 106 is formed at a resin-made cylinder head cover 3 by an insert molding. FIG. 7B shows a cross-sectional view during the insert molding. In FIG. 7B, for an explanatory purpose, dies other than a core 132 are not shown.

In order to fix the valve case 106 to the cylinder head cover 3, fixing portions 3a, 3b made of resin are formed on both ends of a housing portion 111 having a cylindrical space 121. In those circumstances, the fixing portions 3a, 3b need to have an inner diameter equal to or greater than a diameter of the cylindrical space 121 so that the fixing portions 3a, 3b do not interfere with a movement of a spool positioned within the cylindrical space 121. Further, a drain space 122 to which oil is discharged needs to be formed at a fore-end side (i.e., right-hand side in FIG. 7A) of the housing portion 111.

In order to achieve the foregoing requirements, generally, an insert molding is performed using a cylindrical slide pin 131 and the core 132 as shown in FIG. 7B. That is, the fixing portions 3a, 3b whose inner diameter is the same with the diameter of the cylindrical space 121 is formed by inserting the cylindrical slide pin 131 having a diameter the same size with the diameter of the cylindrical space 121 for positioning the valve case 106. Further, by arranging the core 132 having a convex shape, the drain space 122 which is in communication with the cylindrical space 121 is formed.

According to the foregoing molding method, in order to form the fixing portion 3a at a fore-end portion of the slide pin 131, the slide pin 131 is required to be formed in a straight shape having a diameter the same size with an inner diameter of the housing portion 111 from a rear end to the fore-end. However, in a case where a diameter of the fore-end of the slide pin 131 is the same size with the diameter of the cylindrical space 121 (i.e., to be precise, the diameter of the slide pin 131 is slightly smaller than the diameter of the cylindrical space 121), the fore-end of the slide pin 131 may readily contact an end surface of the housing portion 111 when inserting the slide pin 131 into the cylindrical space 121. In consequence, the valve case 106 may be flawed or deformed, and/or the slide pin 131 may not be inserted into the cylindrical space 121, which may possibly stop a production line for the molding.

A need thus exists for a valve case for an oil control valve which is not susceptible to the drawback mentioned above.

SUMMARY

In light of the foregoing, the disclosure provides a valve case, which includes a housing portion including a cylindrical space for housing a spool of an oil control valve, and a wall portion including a drain space arranged cross to the cylindrical space. The housing portion and the wall portion are integrally formed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a valve case which is formed at a cylinder head cover by an insert molding will be explained with reference to illustrations of drawing figures as follows.

Figure 1:
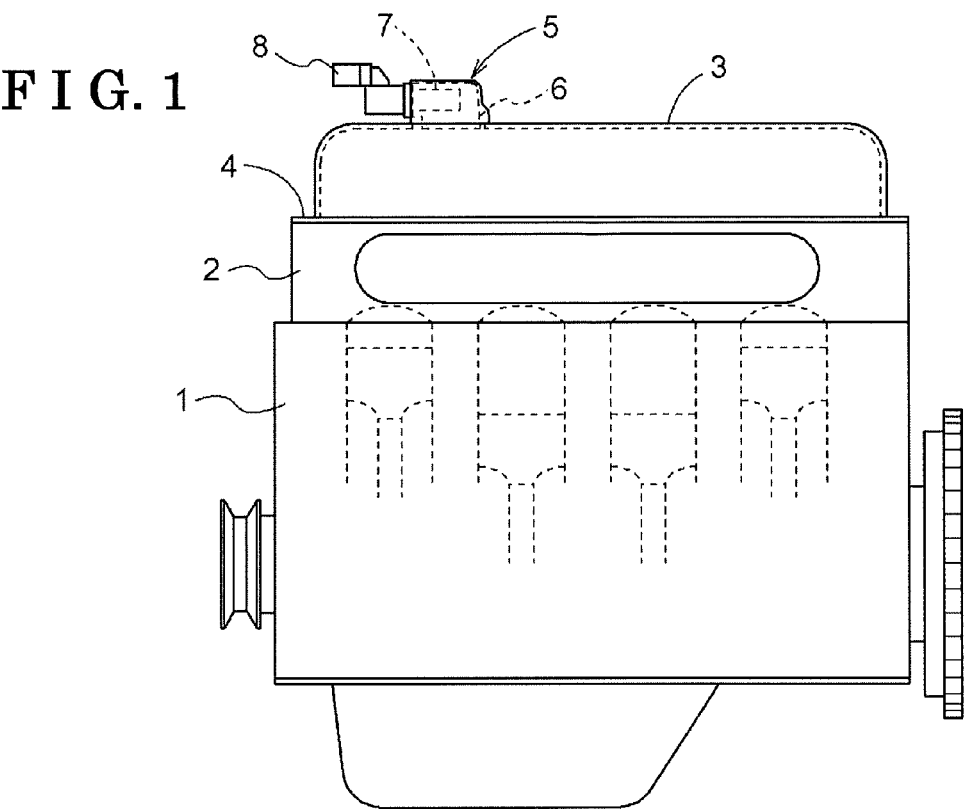
FIG. 1 is a schematic view showing an attached position of an oil control valve according to embodiments disclosed here.

FIG. 1 shows a state where an oil control valve 5 including a valve case 6 is attached to a cylinder head cover 3. A cylinder block 1 and a cylinder head 2 are made by aluminum die casting and designed to resist a high temperature environment during an engine operation. The cylinder head cover 3 is attached to a top portion of the cylinder head 2 via a gasket 4 provided for maintaining airtightness. The cylinder head cover 3 is made of resin for reducing a weight of an engine.

The oil control valve 5 is formed at the top portion of the cylinder head cover 3 by an insert molding and includes the valve case 6 and a spool 7. The oil control valve 5 is connected to an oil passage for controlling a valve timing control apparatus, and is configured to supply the oil to portions of the valve timing control apparatus when appropriate or to discharge the oil therefrom by moving the spool 7 within the valve case 6. In those circumstances, an electromagnetic solenoid 8 is actuated by a signal outputted from an electronic control unit (ECU) to move the spool.

Figure 2A:
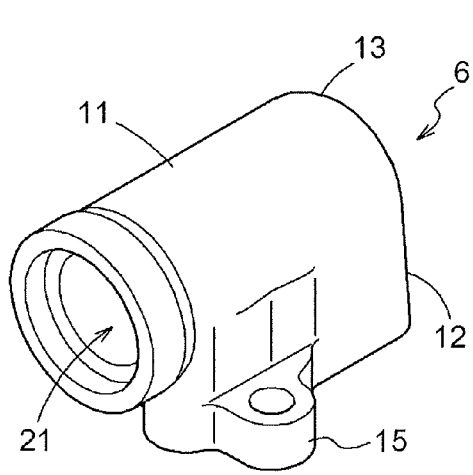
FIGS. 2A and 2B are perspective views of a valve case according to an embodiment disclosed here.
Figure 2B:
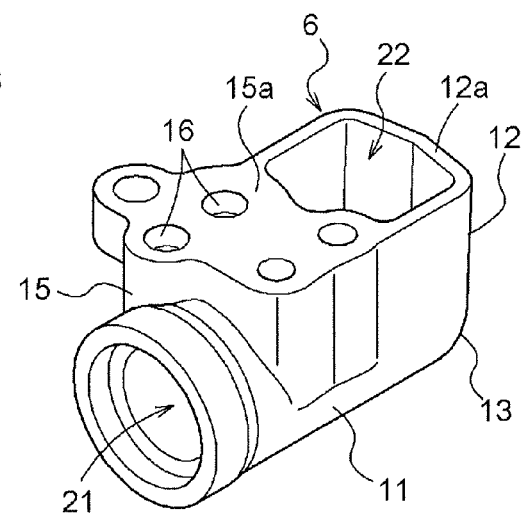

As illustrated in FIG. 2B, the valve case 6 includes a housing portion 11 which is formed with a cylindrical space 21 to which the spool 7 is inserted to be positioned and a wall portion 12 at which a drain space 22 to which the oil is drained is formed. The housing portion 11 and the wall portion 12 are integrally formed via a corner portion 13. A base portion 15 is extended from the housing portion 11 in a direction that the wall portion 12 extends (see FIG. 2A). The base portion 15 includes oil passages 16 which penetrate through the base portion 15 to establish a communication between the cylindrical space 21 and outside of the base portion 15. The oil passages 16 are connected, for example, to an oil passage for controlling the valve timing control apparatus. In those circumstances, the oil passages 16 are not necessarily formed on the base portion 15 to penetrate therethrough and may be formed on a peripheral wall of the housing portion 11 to which the base portion 15 is not formed.

Figure 4A:
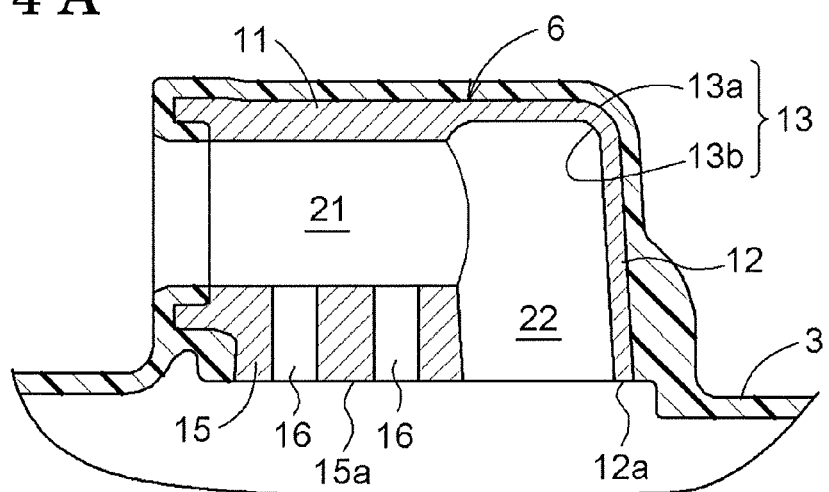
FIGS. 4A and 4B are cross-sectional views of the valve case according to the embodiment disclosed here.
Figure 4B:
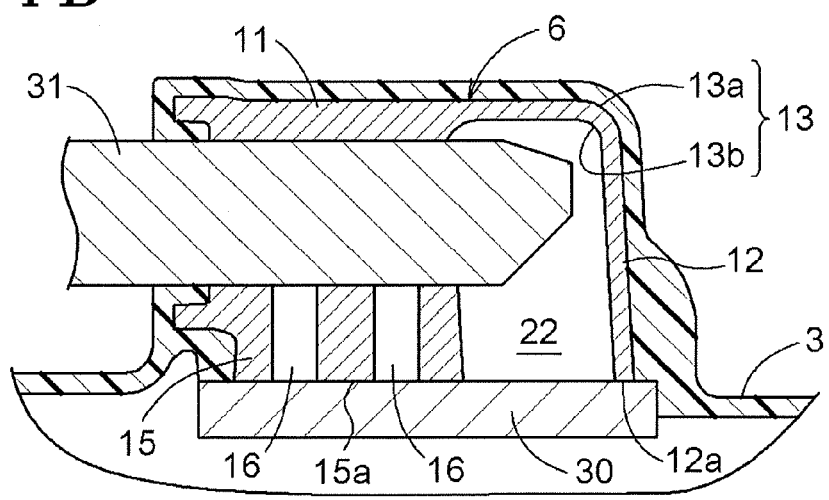

FIG. 4A shows a cross-sectional view after the valve case 6 is formed on the cylinder head cover 3 made of resin by an insert molding. FIG. 4B shows a cross-sectional view during the insert molding. For an explanatory purpose, dies other than a die 30 are not shown in FIG. 4B. According to the construction of the embodiment, because the valve case 6 includes the wall portion 12, the valve case 6 resists the application of an injection pressure and/or a shrinkage stress of the resin which presses the cylindrical housing portion 11 in a radial direction when insert molding the valve case 6 to the cylinder head cover 3.

Figure 7A:
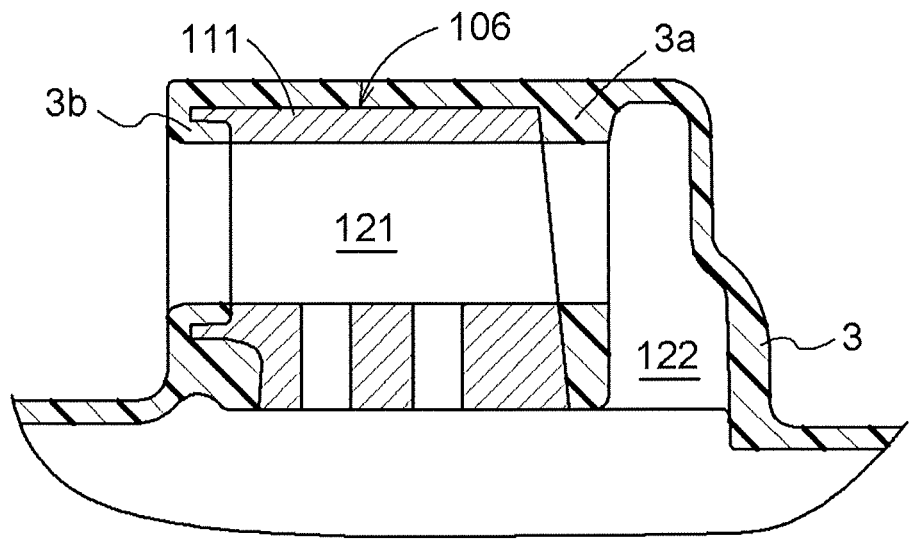
FIGS. 7A and 7B are cross-sectional views of a known valve case.
Figure 7B:
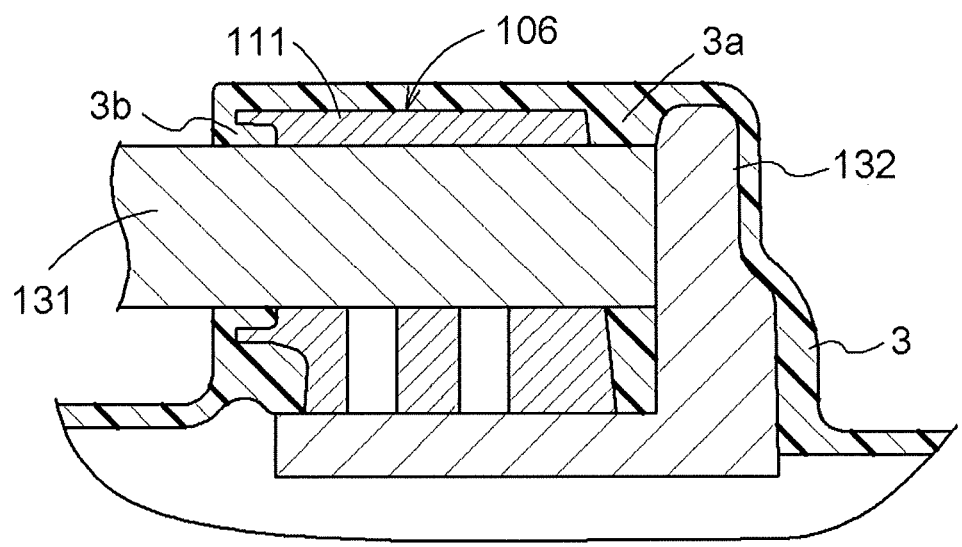

When insert molding the valve case 6, according to the construction of the embodiment, it is not necessary to form the resin-made fixing portion 3a (see FIGS. 7A and 7B) as the known structure, thus it is not necessary to form a slide pin 31 to be straight from an end to another end similar to the known slide pin 131 (see FIGS. 7A and 7B). In consequence, as shown in FIG. 4B, according to the embodiment, by tapering a fore-end of the slide pin 31, a contact of the slide pin 31 to an end surface of the housing portion 11 when inserting the slide pin 31 to the cylindrical space 21 is avoided. Further, because the drain space 22 is formed within the valve case 6, a core for forming the drain space 22 during the insert molding is not necessary. Accordingly, manufacturing costs of the die 30 are reduced and there is no need to adjust the configuration of a fore-end surface of the slide pin 31 to match with a configuration of the core.

Further, according to the valve case 6 of the embodiment, an outer surface 13a and an inner surface 13b of the corner portion 13 which connects the housing portion 11 and the wall portion 12 are formed in round shapes. Thus, a stress concentration applied to the corner portion 13 is reduced to enhance a pressure-resisting performance of the valve case 6. Further, because a flow of the resin in the vicinity of the corner portions 13 when filling, or injecting the resin during the insert molding is assumed to be smooth with the foregoing construction, a generation of a clearance between the cylinder head cover 3 and the valve case 6 and a generation of an unevenness of a resin thickness are restrained. Further, because an edge is not formed at the corner portion 13, a generation of a crack in the resin in the vicinity of the corner portion 13 is restrained.

Figure 3:
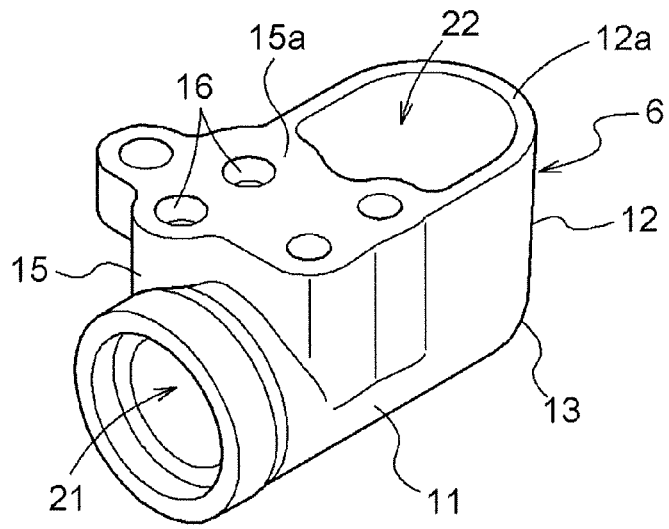
FIG. 3 is a perspective view of a valve case according to a modified example of the embodiment disclosed here.

According to the foregoing embodiment, the wall portion 12 of the valve base 6 shown in FIG. 2 is configured to have corners. However, a configuration of the wall portion 12 may be changed. For example, as shown in FIG. 3, according to a modified example of the embodiment, an inner surface and an outer surface of the wall portion 12 may be configured to be a round shape. With the construction having the round shape wall portion 12, a stress concentration at the wall portion 12 is reduced to enhance a pressure-resisting performance of the valve case 6.

Further, according to the construction of the valve case 6 of the embodiment, a level of a bottom surface 15a of the base portion 15 corresponds to a level of an end surface 12a of the wall portion 12. In consequence, because the die 30 on which the valve case 6 is positioned during the insert molding is configured to have a plane surface, a configuration of the die 30 is simplified and the valve case 6 is likely to be positioned in a stable state during the insert molding. Further, because the oil passages 16 are formed on the base portion 15, the base portion 15 including regions where the oil passages 16 are formed is formed in a larger configuration. Accordingly, a stability when positioning the valve case 6 to the die 30 is further enhanced thus to enhance an operability and a precision of insert molding. Further, because the drain space 22 and an opening end surface of the oil passages 16 are formed on a common plane surface, the die 30 having the plane surface configuration to which the valve case 6 is positioned is commonly used as a die provided for preventing the resin from injecting into the drain space 22 and the oil passages 16, which simplifies the die construction.

Because the wall portion 12 is formed in a configuration having a high rigidity against the injection pressure and the shrinkage stress of the resin applied in a radial inward direction to press the housing portion 11 in the radial inward direction, a thickness of the wall portion 12 may be structured to be thinner than the housing portion 11. Accordingly, a weight of the valve case 6 can be reduced.

In order to ensure a smooth sliding movement of the spool 7 in the cylindrical space 21, an inner wall of the housing portion 11 may be formed by a cutting. On the other hand, a function of the drain space 22 as an outlet port of the oil is adequately achieved without a finishing machining, the finishing machining of an inner wall of the wall portion 12 may be omitted to reduce a manufacturing cost of the valve case 6.

Figure 5:
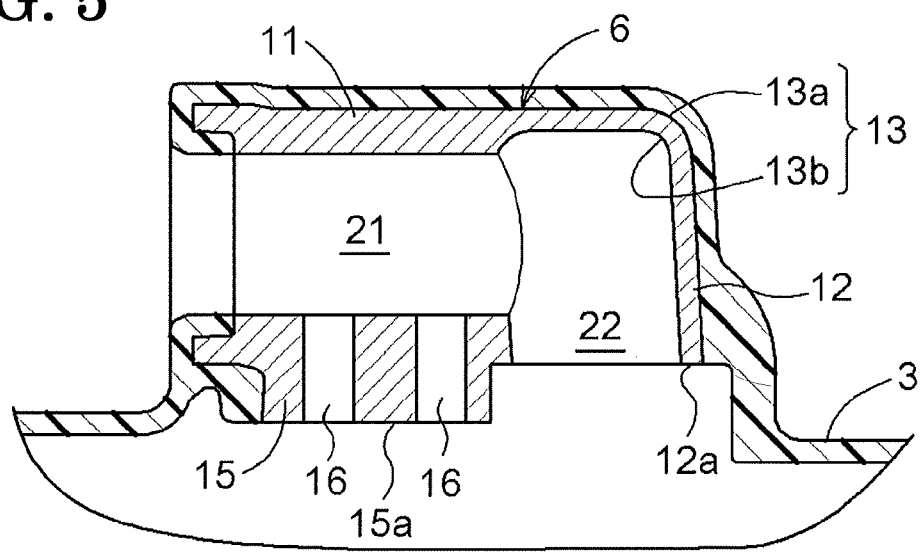
FIG. 5 is a cross-sectional view of the valve case according to a modified example of the embodiment disclosed here.
Figure 6:
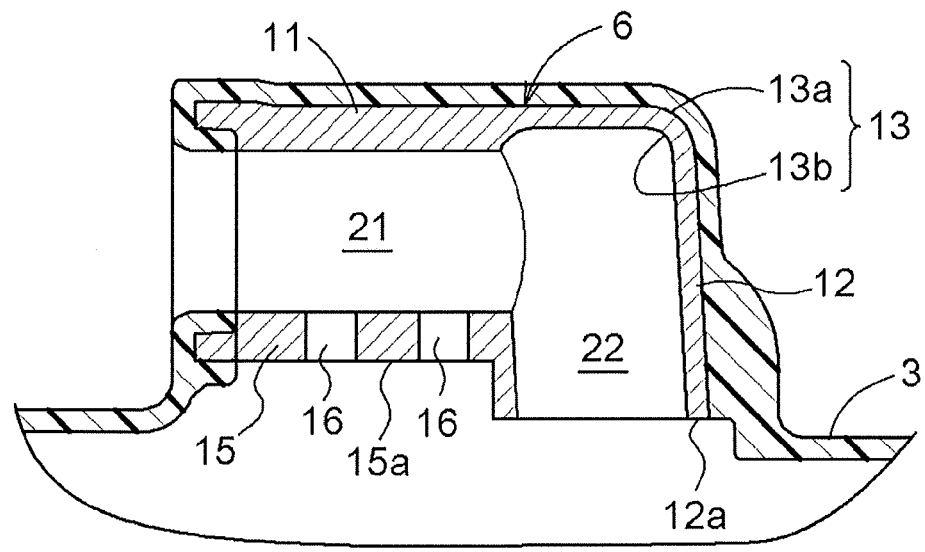
FIG. 6 is a cross-sectional view of the valve case according to a modified example of the embodiment disclosed here.

Modified examples of the valve case 6 of the embodiment will be explained with reference to FIGS. 5 and 6. According to the valve case 6 shown in FIG. 5, the end surface 12a of the wall portion 12 is formed at a position higher than the bottom surface 15a of the base portion 15. Further, according to the valve case 6 shown in FIG. 6, the bottom surface 15a of the base portion 15 is formed at a position higher than the end surface 12a of the wall portion 12. With the constructions of the modified examples shown in FIGS. 5 and 6, although it is necessary to configure a die to which the valve case 6 is positioned during the insert molding to have a recess and convex surfaces (i.e., uneven surface), the valve case 6 is downsized and a weight of the valve case 6 is reduced.

The valve case 6 of the embodiment is applicable to a valve case which houses a spool for an oil control valve.

According to the embodiment, the valve case 6 includes the housing portion 11 including the cylindrical space 21 for housing the spool 7 of the oil control valve 5, and the wall portion 12 including the drain space 22 arranged cross to the cylindrical space 21. The housing portion 11 and the wall portion 12 are integrally formed.

According to the construction of the embodiment, when the injection pressure and/or the shrinkage stress of the resin is applied to press the housing portion 11 in a radially inward direction when insert molding the valve case 6, the wall portion 12 integrally formed with the housing portion 11 serves as a reinforcement against the pressures. Accordingly, the pressure-resisting performance of the valve case 6 is enhanced.

Further, according to the embodiment, the housing portion 11 is integrally formed with the wall portion 12, and an outer surface of the housing portion 11 and the wall portion 12 may be covered with the resin when molding. Thus, according to the embodiment, there is no need to form the fixing portion having the same diameter with the cylindrical space at the fore-end of the housing portion 11 as the known valve case. Accordingly, it is not necessary to form the fore-end of the slide pin to have a straight configuration. For example, by tapering the fore-end portion of the slide pin 31, a contact of the slide pin 31 to the end surface of the housing portion 11 when inserting the slide pin 31 into the cylindrical space 21 can be avoided to smoothly insert the slide pin 31 into the cylindrical space 21. Further, because the drain space 22 is formed within the valve case 6, there is no need to provide the core for forming the drain space 22 when insert molding.

According to the embodiment, the valve case 6 further includes the corner portion 13 connecting the housing portion 11 and the wall portion 12. The outer surface of the corner portion 13 is formed in a round shape.

According to the embodiment, because the stress concentration generated in the vicinity of the outer surface of the corner portion 13 can be restrained, the pressure-resisting performance of the valve case 6 is further enhanced. Further, because a flow of the resin at the corner portion 13 when filling the resin is assumed to be smooth, generation of a clearance between the resin and the valve case 6 and a generation of an unevenness of a resin thickness is restrained. Further, because an edge is not formed at the corner portion 13, a generation of a crack in the resin in the vicinity of the corner portion 13 is restrained.

According to the embodiment of the valve case 6, the inner surface of the corner portion 13 is formed in a round shape.

According to the embodiment, because the stress concentration generated in the vicinity of the inner surface of the corner portion 13 can be restrained, the pressure-resisting performance of the valve case 6 is further enhanced.

According to the embodiment, the valve case 6 further includes the base portion 15 integrally formed on an outer peripheral surface of the housing portion 11 for supporting the housing portion 11. Levels of the bottom surface 15a of the base portion and the end surface 12a of the wall portion 12 are evenly formed.

According to the embodiment, because the bottom surface 15a of the base portion 15 is configured so that the levels of the bottom surface 15a of the base portion 15 and the end surface 12a of the wall portion 12 are evenly formed, the die 30 on which the valve case 6 is positioned during the insert molding is configured to have a plane surface, thus simplifying a configuration of the die 30, and the valve case 6 is likely to be positioned in a stable state during the insert molding.

According to the embodiment of the valve case 6, the base portion 15 is formed with at least one oil passage formed penetrating through the base portion 15 to establish communication between the cylindrical space 21 and the outside of the base portion 15.

According to the embodiment, because the oil passage 16 is formed on the base portion 15, the base portion 15 can be provided to an entire range of the housing portion 11 irrespective of the positioning of the oil passage 16, the stability when positioning the valve case 6 on the die 30 is enhanced and thus the operability and the precision of the insert molding are enhanced. Further, because the drain space 22 and the opening end surface of the oil passage 16 are positioned on the common plane surface, the die 30 having the plane surface configuration to which the valve case 6 is positioned is commonly used as a die provided for preventing the resin from injecting into the drain space 22 and the oil passage 16, which simplifies the die construction.

According to the embodiment of the valve case 6, the drain space 22 is arranged cross to the cylindrical space 21 to form an L-shape.

According to the embodiment of the valve case 6, the inner surface and the outer surface of the wall portion 12 is formed in a round shape.

According to the construction of the embodiment, the stress concentration applied to the wall portion 12 is reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve case disposed within a cylinder head cover, comprising:
    a housing portion including a cylindrical space for housing a spool of an oil control valve which enters one axial end of the cylindrical space in a direction parallel to a central axis of the cylindrical space; and
    a wall portion including a drain space arranged in its depth direction at a nonzero angle and non-parallel with respect to a depth direction of the cylindrical space, the central axis of the cylindrical space intersecting the wall portion; wherein
    the drain space is arranged at an other axial end of the cylindrical space opposite the one axial end of the cylindrical space;
    the housing portion and the wall portion are integrally formed;
    one endmost portion of the housing portion, which is on an opposite side of the valve case relative to the wall portion, is surrounded and contacted by resin of the cylinder head cover;
    the resin of the cylinder head cover contacts the wall portion to thereby cover the wall portion;
    the valve case is formed at the cylinder head cover by insert molding;
    a thickness of the wall portion is thinner than a thickness of the housing portion; and
    an outline shape of the wall portion, in a plane which is perpendicular to the depth direction of the drain space, is formed in an arc shape.

2. The valve case according to claim 1, wherein the drain space is arranged perpendicular to the cylindrical space to form an L-shape.

3. The valve case according to claim 1, wherein an inner surface and an outer surface of the wall portion is formed in a round shape.

4. The valve case according to claim 1, wherein
- a base portion is integrally formed on an outer peripheral surface of the housing portion for supporting the housing portion; and
- wherein levels of a bottom surface of the base portion and an end surface of the wall portion are uniform.

5. The valve case according to claim 4, wherein the base portion is formed with at least one oil passage formed penetrating through the base portion to establish communication between the cylindrical space and an outside of the base portion.

6. The valve case according to claim 1 further comprising:
- a corner portion connecting the housing portion and the wall portion; wherein an outer surface of the corner portion is formed in a round shape.

7. The valve case according to claim 6, wherein the drain space is arranged perpendicular to the cylindrical space to form an L-shape.

8. The valve case according to claim 6, wherein an inner surface and an outer surface of the wall portion is formed in a round shape.

9. The valve case according to claim 6, wherein
- a base portion is integrally formed on an outer peripheral surface of the housing portion for supporting the housing portion; and
- wherein levels of a bottom surface of the base portion and an end surface of the wall portion are uniform.

10. The valve case according to claim 9, wherein the base portion is formed with at least one oil passage formed penetrating through the base portion to establish communication between the cylindrical space and an outside of the base portion.

11. The valve case according to claim 6, wherein an inner surface of the corner portion is formed in a round shape.

12. The valve case according to claim 11, wherein the drain space is arranged perpendicular to the cylindrical space to form an L-shape.

13. The valve case according to claim 11, wherein an inner surface and an outer surface of the wall portion is formed in a round shape.

14. The valve case according to claim 11, wherein
- a base portion is integrally formed on an outer peripheral surface of the housing portion for supporting the housing portion; and
- wherein levels of a bottom surface of the base portion and an end surface of the wall portion are uniform.

15. The valve case according to claim 14, wherein the base portion is formed with at least one oil passage formed penetrating through the base portion to establish communication between the cylindrical space and an outside of the base portion.

16. A valve case disposed within a cylinder head cover, comprising:
- a housing portion having a cylindrical space for housing a spool of an oil control valve which enters one axial end of the cylindrical space in a direction parallel to a central axis of the cylindrical space; and
- a wall portion including a drain space arranged in its depth direction at a nonzero angle and non-parallel with respect to a depth direction of the cylindrical space, the central axis of the cylindrical space intersecting the wall portion, wherein
- the drain space is arranged at an other axial end of the cylindrical space opposite the one axial end of the cylindrical space,
- resin of the cylinder head cover is disposed at an inside of and surrounds and contacts one endmost portion of the housing portion,
- the resin of the cylinder head cover contacts the wall portion to thereby cover the wall portion,
- the valve case is formed at the cylinder head cover by insert molding,
- a thickness of the wall portion is thinner than a thickness of the housing portion, and
- an outline shape of the wall portion, in a plane which is perpendicular to the depth direction of the drain space, is formed in an arc shape.

* * * * *